(12) United States Patent
Sutou et al.

(10) Patent No.: US 7,597,377 B2
(45) Date of Patent: Oct. 6, 2009

(54) INSTRUMENT PANEL

(75) Inventors: Mitsuru Sutou, Hamamatsu (JP);
Keiichi Masada, Hamamatsu (JP);
Toshiyuki Yamada, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 12/139,052

(22) Filed: Jun. 13, 2008

(65) Prior Publication Data

US 2008/0315610 A1    Dec. 25, 2008

(30) Foreign Application Priority Data

Jun. 21, 2007   (JP)   ............... 2007-163553

(51) Int. Cl.
*B62D 25/14* (2006.01)
(52) U.S. Cl. ..................... 296/70; 296/37.12
(58) Field of Classification Search ............ 296/70, 296/193.02, 37.12; 180/90; 362/29, 489; 248/27.1; 280/752, 729
See application file for complete search history.

(56) References Cited

U.S. PATENT DOCUMENTS

| | | | | |
|---|---|---|---|---|
| 5,202,913 A | * | 4/1993 | Lang et al. | ............... 455/575.9 |
| 5,273,597 A | * | 12/1993 | Kumagai et al. | ............... 156/79 |
| 5,364,159 A | * | 11/1994 | Kelman et al. | ................ 296/70 |
| 5,775,796 A | * | 7/1998 | Weber | ......................... 362/496 |
| 5,915,776 A | * | 6/1999 | Bieri | ............................ 296/70 |
| 6,073,987 A | * | 6/2000 | Lindberg et al. | .............. 296/70 |
| 6,428,072 B1 | * | 8/2002 | Moore | ......................... 296/70 |
| 6,517,145 B2 | * | 2/2003 | Hedderly | ...................... 296/70 |
| 6,705,659 B2 | * | 3/2004 | Suzuki et al. | .................. 296/70 |
| 6,802,559 B2 | * | 10/2004 | Yoshihara et al. | ......... 296/37.12 |
| 7,036,865 B2 | * | 5/2006 | Sato et al. | ..................... 296/70 |
| 7,201,420 B2 | * | 4/2007 | Vican | ...................... 296/37.12 |
| 7,425,891 B2 | * | 9/2008 | Colburn et al. | .............. 340/438 |
| 2002/0017798 A1 | * | 2/2002 | Shikata et al. | ................ 296/70 |
| 2008/0180963 A1 | * | 7/2008 | Clauw et al. | ................. 362/489 |
| 2009/0015031 A1 | * | 1/2009 | Sato et al. | ..................... 296/70 |

FOREIGN PATENT DOCUMENTS

JP     1-22758 Y2    10/1985
JP     2005-297765 A    10/2005

* cited by examiner

*Primary Examiner*—Kiran B. Patel
(74) *Attorney, Agent, or Firm*—Alston & Bird LLP

(57) ABSTRACT

There is provided an instrument panel capable of uniformly brightening the interior of a storage part without special provision of a light source. In the instrument panel including an operation part (2) having an operation panel (3) for controlling a vehicle; a light source (6) for illuminating the operation panel (3), which the light source (6) is provided in the operation part (2); and the storage part (4) arranged adjacent to the operation part (2), an opening (7) is provided between the operation part (2) and the storage part (4); a tray (8) is provided between the opening (7) and the storage part (4) as a wall surface; and the tray (8) is formed of a material capable of transmitting the light of the light source (6), which is transmitted via the opening (7).

8 Claims, 4 Drawing Sheets

INSTRUMENT PANEL

FIELD OF THE INVENTION

The present invention relates to an instrument panel provided with a storage part adjacent to an operation part. More particularly, it relates to an instrument panel capable of illuminating the interior of the storage part without special provision of a light source.

BACKGROUND OF THE INVENTION

An instrument panel for a vehicle is provided with various operation parts capable of controlling vehicular equipment. In many cases, the passenger touches an operation panel provided in the operation part to control the vehicular equipment. Examples of equipment having such an operation part may include an air conditioner unit, audio equipment, and the like. Also, some instrument panels are provided with a storage part for storing small articles and the like. Both the operation part and the storage part are provided with a light source, and the instrument panel has a function of illuminating the operation panel and the interior of the storage panel by means of the respective light sources so that the passenger can see in the dark, for example, at night.

In particular, regarding the storage part, the interior thereof is required to be illuminated uniformly so that the passenger can visually confirm that small articles and the like are put in the storage part surely. An instrument panel to satisfy such requirement has been disclosed in Japanese Patent Provisional Publication No. 2005-297765. In the instrument panel described in Japanese Patent Provisional Publication No. 2005-297765, a panel part configured as an openable and closable lid is provided in the storage part, and a light source moving in association with the opening/closing operation of the panel part is provided. Therefore, in the state in which the panel part is closed, the panel part itself is illuminated by the light source, and in the state in which the panel part is open, the interior of storage part is illuminated by the light source.

Also, in order to efficiently illuminate both the operation part and the storage part, the operation part and the storage part are illuminated by the same light source. Such an instrument panel has been disclosed in Japanese Utility Model Publication No. 1-22758. In the instrument panel described in Japanese Utility Model Publication No. 1-22758, audio equipment is mounted, and the panel of the audio equipment is covered with a finisher. The finisher is configured so as to cause light emitted from a single light source to pass through a lighting part of audio operation panel, and to transmit the light to a lighting part arranged in the storage part. Therefore, both the operation panel and the storage part are illuminated by the light emitted from the respective lighting parts.

BRIEF SUMMARY OF THE INVENTION

However, in the instrument panel described in Japanese Patent Provisional Publication No. 2005-297765, the light source is provided for the storage part only, so that to illuminate the operation panel, a separate light source is necessary. Therefore, the number of parts increases, the manpower for assembling parts increases, and part control becomes more difficult, resulting in an increase in costs. Also, to provide a plurality of light sources, a space is further needed, so that the storage space of the storage part decreases with the increase in space for arranging the light sources.

Also, in the instrument panel described in Japanese Utility Model Publication No. 1-22758, the finisher for transmitting the single light source has an intricate shape. Therefore, the finisher is difficult to manufacture, and resultantly the cost for manufacturing the finisher increases. Also, although the interior of the storage part is illuminated by the light of the lighting part, it is difficult to illuminate the peripheral portion of the lighting part by means of the light of the lighting part, so that it is difficult to give uniform brightness to the interior of the storage part.

Accordingly, an object of the present invention is to provide an instrument panel capable of uniformly brightening the interior of a storage part without special provision of a light source.

To achieve the above object, an instrument panel in accordance with the present invention has the features as described below. In the instrument panel including an operation part having an operation panel for controlling a vehicle; a light source for illuminating the operation panel, which the light source is provided in the operation part; and a storage part arranged adjacent to the operation part, an opening is provided between the operation part and the storage part; a tray is provided between the opening and the storage part as a wall surface; and the tray is formed of a material capable of transmitting the light of the light source, which is transmitted via the opening.

In the instrument panel in accordance with the present invention, the tray may be formed so that the thickness thereof changes partially.

In the instrument panel in accordance with the present invention, the configuration may be such that the storage part is formed as a space having an opening end part on the vehicle rear side; the light source and the opening are arranged below the storage part; the tray is arranged on the lower side of the space; and the storage part is formed so that the upper-side part of the opening end part extends to the vehicle rear side from the lower-side part of the opening end part, which forms the tray.

In the instrument panel in accordance with the present invention, the tray may be formed as a part separate from the body of the instrument panel.

According to the present invention, the following effects can be achieved. The instrument panel in accordance with the present invention has a feature such that the instrument panel includes an operation part having an operation panel for controlling a vehicle; a light source for illuminating the operation panel, which light source is provided in the operation part; and a storage part arranged adjacent to the operation part, and is characterized in that an opening is provided between the operation part and the storage part; a tray is provided between the opening and the storage part as a wall surface; and the tray is formed of a material capable of transmitting the light of the light source, which is transmitted via the opening. Therefore, both the operation part and the storage part can be illuminated by the light of the same light source without the use of a part having a complicated construction. As a result, the parts are easy to manufacture, the number of parts decreases, the manpower for assembling parts decreases, and part control is easy to perform, whereby costs can be reduced.

In the instrument panel in accordance with the present invention, the tray may be formed so that the thickness thereof changes partially. The transmission amount of light of the light source can be changed according to the change in the thickness. Therefore, the brightness of each portion of the storage part can be adjusted.

In the instrument panel in accordance with the present invention, the configuration may be such that the storage part is formed as a space having an opening end part on the vehicle rear side; the light source and the opening are arranged below the storage part; the tray is arranged on the lower side of the space; and the storage part is formed so that the upper-side part of the opening end part extends to the vehicle rear side from the lower-side part of the opening end part, which forms the tray. By arranging the storage part on the upper side of the operation part, the above-described effects can be achieved while preventing the negative effect that the light of the light source going from the downside to the upside falls on a windshield glass arranged on the upper side of the instrument panel.

In the instrument panel in accordance with the present invention, the tray may be formed as a part separate from the body of the instrument panel, so that the tray is made of a translucent material, and the body of the instrument panel can be made of a separate material.

DETAILED DESCRIPTION OF THE INVENTION

Figure 1:
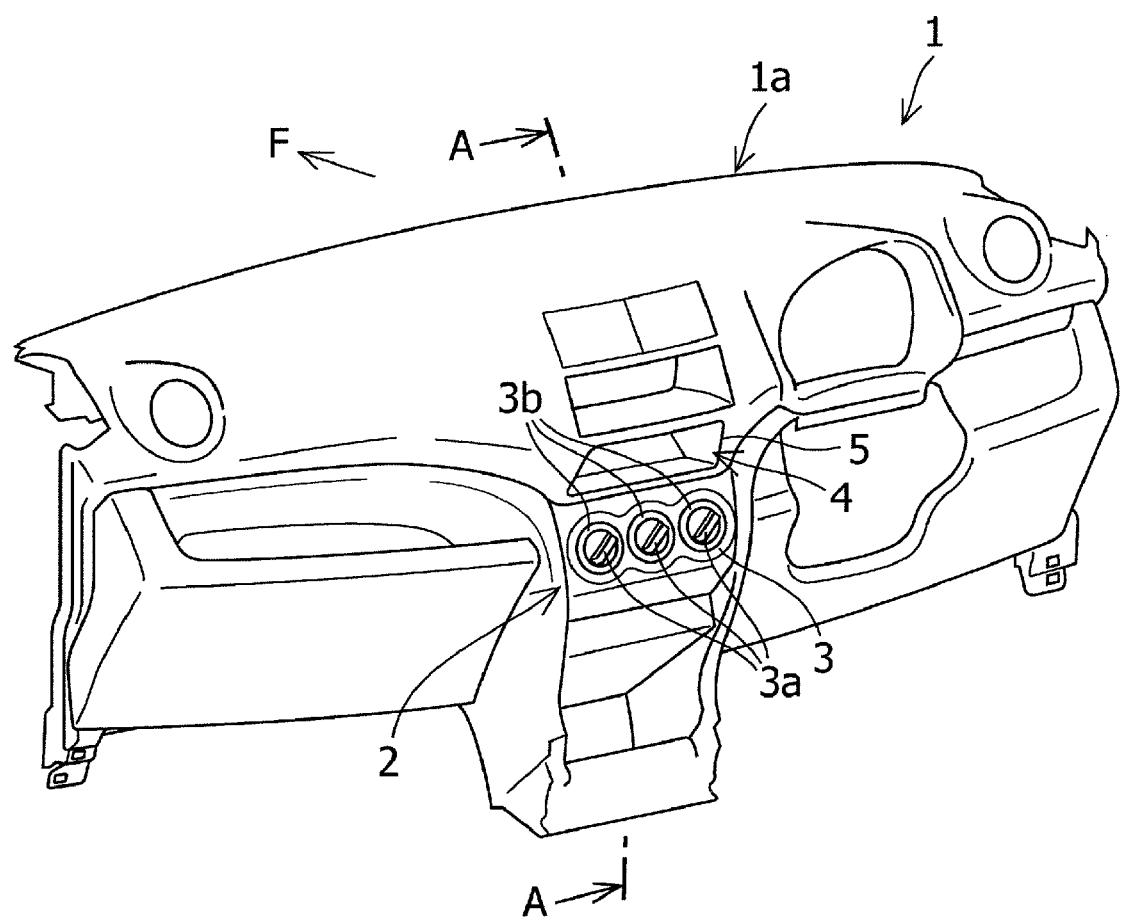
FIG. 1 is a perspective view schematically showing the whole of an instrument panel in accordance with a first embodiment of the present invention.

FIG. 1 shows the whole of an instrument panel 1 in accordance with a first embodiment of the present invention. In this figure, the vehicle front direction is denoted by F. In the first embodiment of the present invention, as shown in FIG. 1, the instrument panel 1 is provided with a body 1a. In the central portion in the vehicle width direction of the instrument panel 1, an air conditioner unit operation part 2 for controlling an air conditioner is provided. On the vehicle rear side of the operation part 2, an operation panel 3 is arranged. The operation panel 3, which is generally called a heater control panel, is configured as a part of the surface of the instrument panel 1. The operation panel 3 is provided with operating members such as dials 3a. Display parts 3b each manufactured of a material capable of transmitting light are provided so as to surround the peripheries of the dials 3a.

A storage part 4 is provided adjacent to the upper side of the operation part 2 in the instrument panel 1. The storage part 4 is formed so as to have a substantially rectangular parallelepiped shaped space. On the vehicle rear side of the storage part 4, an opening end part 5 is provided.

Figure 2:
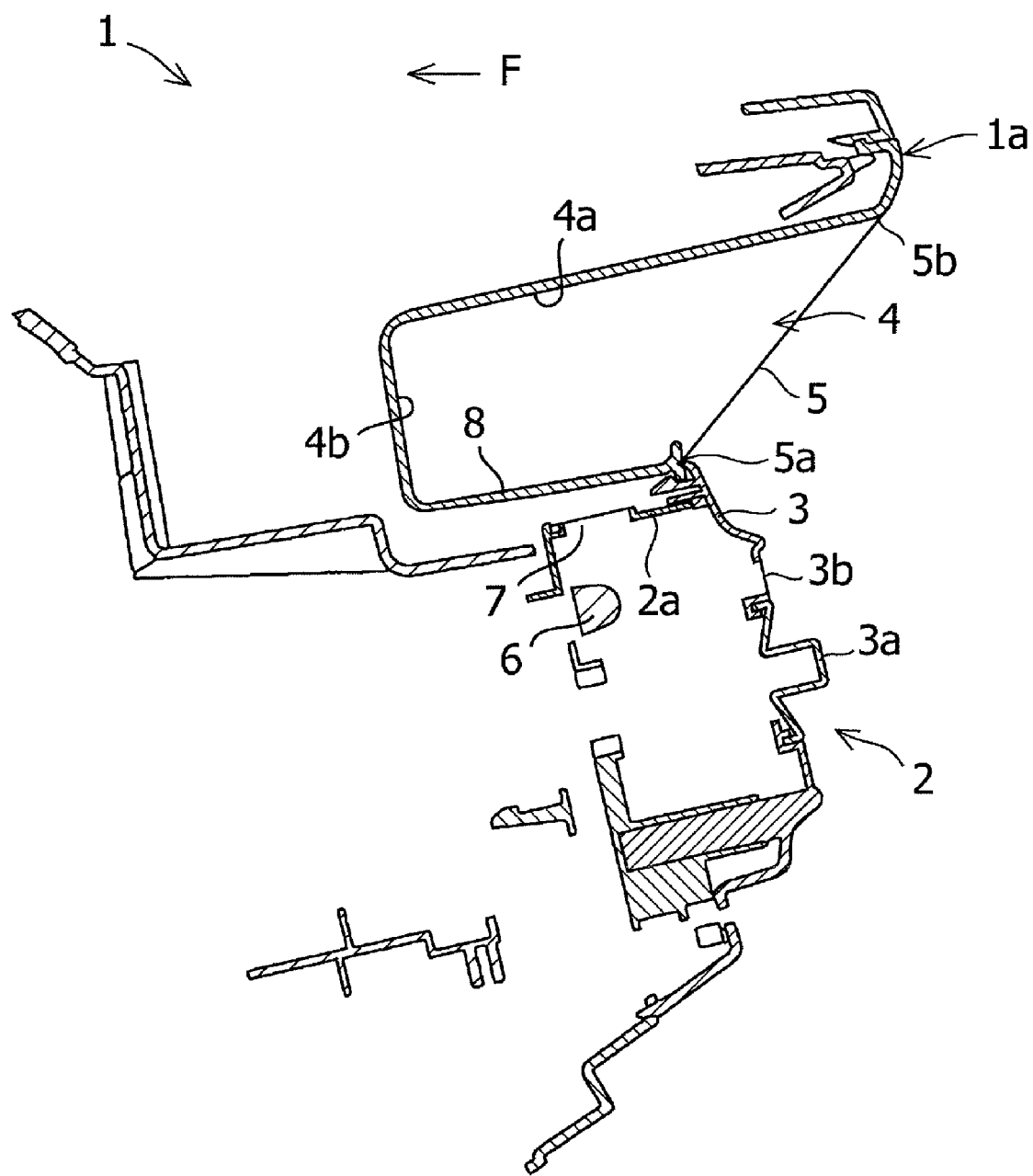
FIG. 2 is a sectional view taken along the line A-A of FIG. 1.

FIG. 2 is a sectional view taken along the line A-A of FIG. 1. In this figure, the vehicle front direction is denoted by F. As shown in FIG. 2, a light source 6 is provided in the operation part 2. More specifically, the light source 6 is disposed at a position close to an upper-side part 2a of the operation part 2 with a space being provided in the vehicle longitudinal direction from the operation panel 3. The upper-side part 2a of the operation part 2 is positioned above the light source 6. An opening 7 is formed in the upper-side part 2a. Above the upper-side part 2a and the opening 7 of the operation part 2, a tray 8 is arranged. The tray 8, which is made of a translucent polypropylene material capable of transmitting light, is configured integrally with the storage part 4 as the lower-side wall surface of the storage part 4.

According to the above-described configuration, the light of the light source 6 goes through the display parts 3b to light the operation panel 3, and also can go through the tray 8 via the opening 7 to light the storage part 4. Therefore, both the operation panel 3 and the storage part 4 can be illuminated by the light of the same light source 6 without the use of a part having a complicated construction. As a result, the parts are easy to manufacture, the number of parts decreases, the manpower for assembling parts decreases, and the part control is easy to perform, whereby the cost can be reduced.

Also, the rear end part in the vehicle longitudinal direction of the tray 8 is formed as a lower-side part 5a of the opening end part 5. The rear end part in the vehicle longitudinal direction of an upper-side wall surface 4a forming the storage part 4 is formed as an upper-side part 5b of the opening end part 5. The upper-side part 5b is formed so as to extend to the vehicle rear side from the lower-side part 5a.

Therefore, the negative effect that the light of the light source 6 going from the downside to the upside falls on a windshield glass (not shown) arranged on the upper side of the instrument panel 1 can be prevented.

Figure 3:
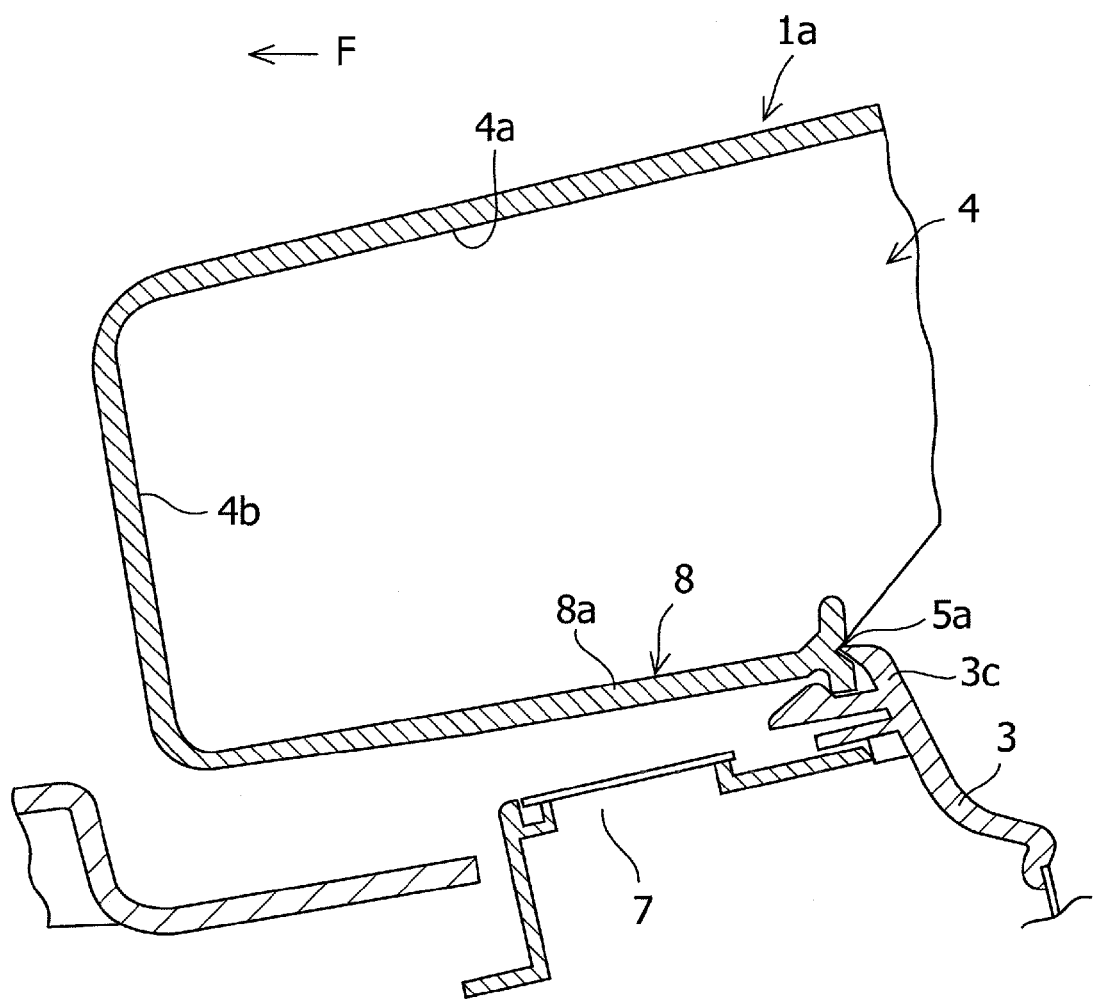
FIG. 3 is an enlarged view of a storage part shown in FIG. 2.

Referring to FIG. 3, the tray 8 is provided with an illumination center part 8a. The illumination center part 8a is located above the opening 7, specifically, in the center in the vehicle width direction of the tray 8 so as to be close to the vehicle rear side. The tray 8 is formed so that the thickness thereof decreases from the illumination center part 8a in the flat surface direction. Explaining with taking the whole of the flat surface of the tray 8 into consideration, the thickness of the tray 8 decreases gradually from the illumination center part 8a in a radial form spreading in the flat surface direction.

Therefore, in a portion in which the thickness of the tray 8 is small, the transmission amount of the light of the light source 6 is large, so that the brightness is high, and in a portion in which the thickness of the tray 8 is large, the transmission amount of the light of the light source 6 is small, so that the brightness is low. On the other hand, in a location separate from the opening 7, the intensity of light of the light source 6 is low, and in a location close to the opening 7, the intensity of light of the light source 6 is high. Therefore, since weak light of the light source 6 penetrates the portion in which the thickness of the tray 8 is small, the transmission amount of the weak light of the light source 6 does not decrease, and since strong light of the light source 6 penetrates the portion in which the thickness of the tray 8 is large, the transmission amount of the weak light of the light source 6 decreases. Therefore, the transmission amount of light of the light source 6, which is transmitted to the storage part 4, is adjusted so as to be uniform. The storage part 4 can have uniform brightness.

Figure 4:
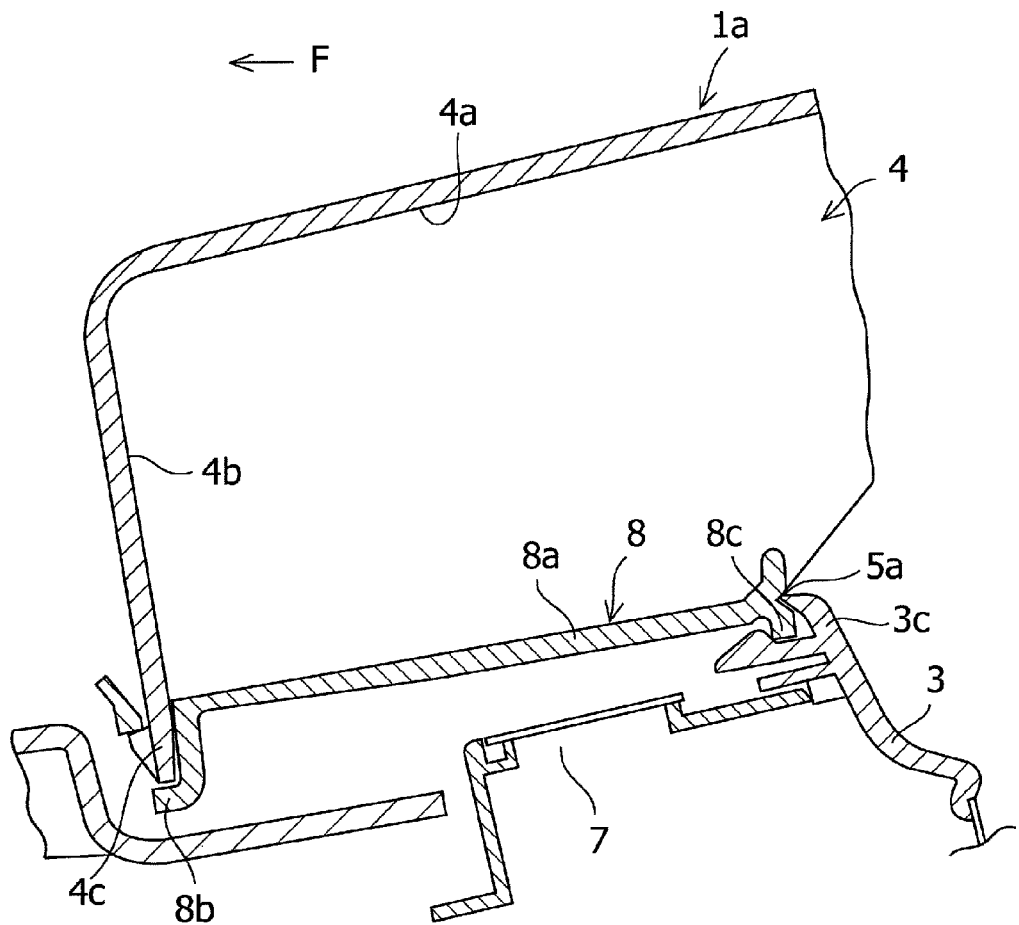
FIG. 4 is an enlarged view of a storage part shown in FIG. 2 in a second embodiment of the present invention.
Figure 5:
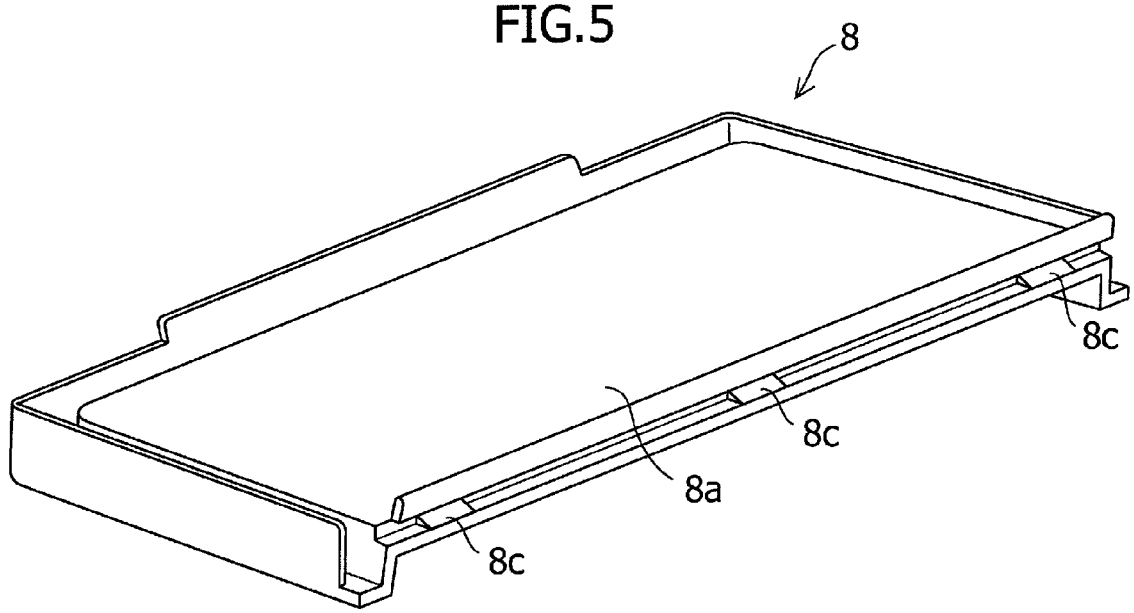
FIG. 5 is a perspective view schematically showing the whole of a tray in a second embodiment of the present invention.

Next, a second embodiment of the present invention is explained. FIG. 4 is an enlarged view of the storage part 4 shown in FIG. 2 in the second embodiment of the present invention, and FIG. 5 schematically shows the whole of the tray 8. Referring to FIGS. 4 and 5, in the front end part in the vehicle longitudinal direction of the tray 8, front-side claw parts 8b is provided, and in the rear end part in the vehicle longitudinal direction of the tray 8, rear-side claw parts 8c are provided. Referring to FIG. 4, in the lower end part of a front-side wall surface 4b in the vehicle longitudinal direction, which forms the storage part 4, a tray front-side attaching part 4c is provided. The tray front-side attaching part 4c is formed so as to be capable of engaging with the front-side claw parts 8b of the tray 8. Further, in the upper end part of the operation part 3, a tray rear-side attaching part 3c is provided. The tray rear-side attaching part 3c is formed so as to be capable of engaging with the rear-side claw parts 8c of the tray 8. According to the above-described configuration, the front-side claw parts 8b and the tray front-side attaching part 4c are engaged with each other, and the rear-side claw parts 8c and the tray rear-side attaching part 3c are engaged with each other. Therefore, the tray 8 is attached to the body 1a of the instrument panel 1. The thickness of the tray 8 decreases gradually from the illumination center part 8a in a radial form spreading in the flat surface direction.

Thereupon, since the tray 8 and the body 1a of the instrument panel 1 are formed by separate parts, the tray 8 is made of a translucent material, and the body 1a of the instrument panel 1 can be made of an another separate material.

The second embodiment has the same configuration as that of the first embodiment except that the tray 8 and the body 1a of the instrument panel 1 are formed by separate parts.

In another embodiment of the present invention, the configuration may be such that the storage part 4 is arranged adjacent to the lower side of the operation part 2 or the right-hand side or the left-hand side in the vehicle width direction of the operation part 2. By changing the arrangement position of the storage part 4 according to the design of the instrument panel, the degree of freedom in designing can be increased.

In another embodiment of the present invention, the storage part 4 may have a shape other than the substantially rectangular parallelepiped shape. By changing the shape of the storage part 4 according to the design of the instrument panel, the degree of freedom in designing can be increased.

In another embodiment of the present invention, the change mode of thickness of the tray 8 may be changed appropriately according to the usage mode of the storage part 4. By changing the shape and the arrangement position of the storage part 4, the brightness of the interior of the storage part 4 can be made uniform by adjusting the transmission amount of light of the light source 6 in the case where the brightness of each portion of the storage part 4 changes. Also, the transmission amount of light of the light source 6 can be adjusted in accordance with the request of illumination design or the like.

That which is claimed:

1. An instrument panel comprising an operation part having an operation panel for controlling a vehicle; a light source for illuminating the operation panel, the light source being provided in the operation part; and a storage part arranged adjacent to the operation part, wherein
   an opening is provided between the operation part and the storage part; a tray is provided between the opening and the storage part as a wall surface; and the tray is formed of a material capable of transmitting the light of the light source, which is transmitted via the opening.

2. The instrument panel according to claim 1, wherein the tray is formed so that the thickness thereof changes partially.

3. The instrument panel according to claim 1, wherein the storage part is formed as a space having an opening end part on a vehicle rear side; the light source and the opening are arranged below the storage part; the tray is arranged on a lower side of the space; and the storage part is formed so that an upper-side part of the opening end part extends to the vehicle rear side from the lower-side part of the opening end part, which forms the tray.

4. The instrument panel according to claim 1, wherein the tray is formed as a part separate from the body of the instrument panel.

5. The instrument panel according to claim 2, wherein the storage part is formed as a space having an opening end part on a vehicle rear side; the light source and the opening are arranged below the storage part; the tray is arranged on a lower side of the space; and the storage part is formed so that an upper-side part of the opening end part extends to the vehicle rear side from the lower-side part of the opening end part, which forms the tray.

6. The instrument panel according to claim 2, wherein the tray is formed as a part separate from the body of the instrument panel.

7. The instrument panel according to claim 3, wherein the tray is formed as a part separate from the body of the instrument panel.

8. The instrument panel according to claim 5, wherein the tray is formed as a part separate from the body of the instrument panel.

* * * * *